(No Model.)

T. O. EARLE.
LACE HOLE CUTTER FOR BELTS.

No. 457,708. Patented Aug. 11, 1891.

WITNESSES:
J. A. E. Criswell
C. Sedgwick

INVENTOR:
T. O. Earle
BY Munn & Co.
ATTORNEYS

THE NORRIS PETERS CO., PHOTO-LITHO., WASHINGTON, D. C.

UNITED STATES PATENT OFFICE.

THEODORE O. EARLE, OF BINGHAMTON, NEW YORK.

LACE-HOLE CUTTER FOR BELTS.

SPECIFICATION forming part of Letters Patent No. 457,708, dated August 11, 1891.

Application filed July 17, 1890. Serial No. 359,006. (No model.)

*To all whom it may concern:*

Be it known that I, THEODORE O. EARLE, of Binghamton, in the county of Broome and State of New York, have invented a new and Improved Lace-Hole Cutter for Belts, of which the following is a full, clear, and exact description.

My invention relates to an improved lace-hole cutter for belts, and has for its object to provide a neat, light, and durable tool whereby lace-holes may be conveniently and expeditiously produced in a belt without damaging the fibers or fracturing the belt in the least.

A further object of the invention is to provide a tool especially adapted for use upon rubber belts and which will cut a neat clear hole in the thickest belt without subjecting the layers of which such belts are constructed to undue strain or disturbing their relation to each other.

The invention consists in providing a tool with a revolving cutter and in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1:
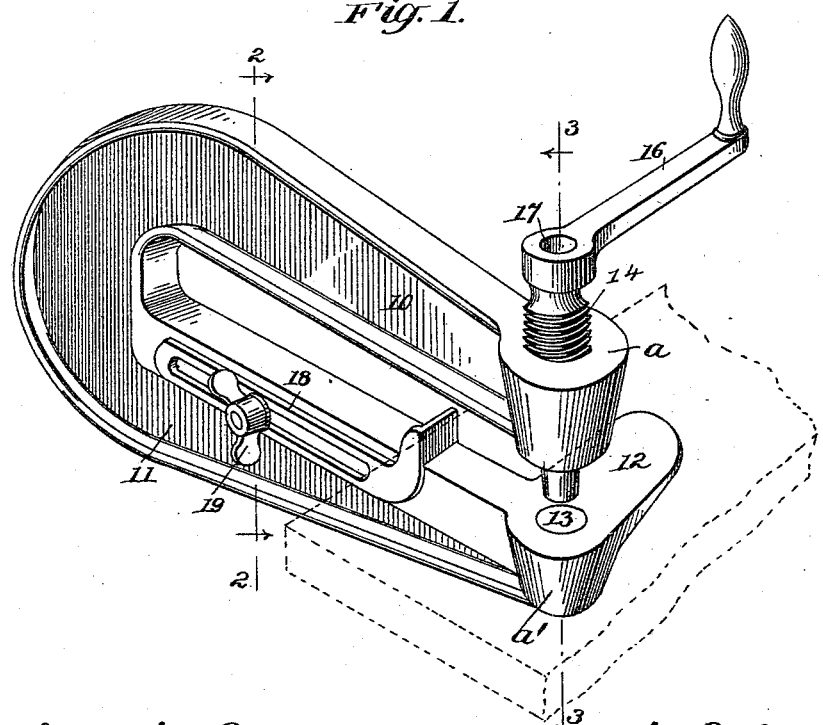
Figure 2:
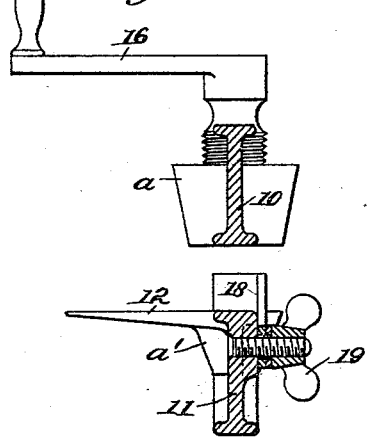

Figure 1 is a perspective view of the complete device, the belt being shown in position in dotted lines. Fig. 2 is a vertical section on line 2 2 of Fig. 1, and Fig. 3 is a vertical section through the cutter and body of the device on line 3 3 of Fig. 1.

The body of the device approximates in contour a C-clamp, and the outer extremities of both the upper member 10 and the lower member 11 are preferably enlarged, as shown at $a$ and $a'$. The upper surface of the lower enlargement is flat, forming thereby a table 12, which table is continued laterally beyond one side of the lower body member. In that portion of the table essentially beneath the center of the upper enlargement $a$ a block 13 of soft metal—such as brass—is introduced, the entire body being preferably made of cast-iron, although other material may be employed, if found desirable.

Figure 3:
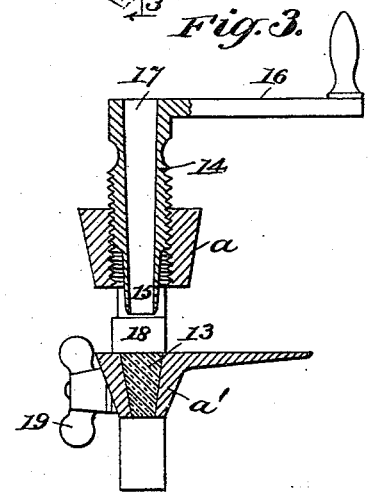

In the enlargement of the upper member 10 a threaded aperture is produced, extending through from top to bottom, and a tubular spindle 14, exteriorly threaded for a portion of its length, is screwed into said aperture, as best shown in Fig. 3. The spindle has formed integral with its lower edge a tubular cutter 15, adapted, when the spindle is screwed a certain distance downward, to engage with the block 13; but the cutter may be attached to the spindle instead of being integral therewith, if in practice it is found advantageous. The upper end of the spindle has attached thereto or formed integral therewith a crank-arm 16, the said crank-arm at its connection with the spindle being provided with an aperture 17, registering with the bore of the spindle. The crank-arm is utilized to manipulate the cutter by revolving the spindle. At one side of the lower body member a gage 18 is located, which gage is adjustably secured to the body by a set-screw 19 or its equivalent. The gage is preferably angular in general contour, one member being slotted to receive the set-screw and extending longitudinally of the said body member and the other member of the gage extends upward and vertically over the upper face of the body member, as shown in Fig. 1.

In operation the spindle is turned in a direction to carry the cutter upward, the gage is properly adjusted, and the edge of the belt near which the holes are to be cut is introduced between the members of the body of tool until it comes in contact with the upper member of the gage. The device is held by the operator in one hand, the thumb of which hand is pressed upon the upper face of the belt immediately over the table-extension, whereby the belt is held in position and is prevented from slipping from the gage. With the other hand the operator manipulates the crank, and the cutter is carried down with a rotary movement into and through the belt. A straight aperture is produced thereby having clear-cut walls, and the under side of the belt at the aperture is as smooth as the corresponding upper surface. It is obvious that the steady pressure exerted by the cutter upon the belt, together with the rotary motion of the cutter when performing its work, causes the cutter to pass through the thickest belt without in the least injuring the fibers near the aperture or in a rubber belt separating in the slightest degree one layer from the other or otherwise fracturing the belt, which invariably happens when lace-holes are punched into belts of this description by the ordinary tools.

Having thus described my invention, I claim as new, and desire to secure by Letters Patent—

As an improved article of manufacture, a lace-hole cutter for belts, consisting of a body provided with two parallel members with a slot between them, a crank-operated screw punch or cutter located at one extremity of the upper member, a table 12, laterally projected at one side of the extremity of the lower member at right angles thereto, and an adjustable gage extending transversely across the lower member in rear of the punch or cutter, whereby the belt may be held in place upon the table while the tool is in the hand of the operator and the cutter is being manipulated, substantially as set forth.

THEODORE O. EARLE.

Witnesses:
J. F. ACKER,
EDGAR TATE.